United States Patent
Kmetz et al.

(10) Patent No.: US 8,986,845 B2
(45) Date of Patent: Mar. 24, 2015

(54) CERAMIC COMPOSITE ARTICLE HAVING LAMINAR CERAMIC MATRIX

(75) Inventors: Michael A. Kmetz, Colchester, CT (US); Kirk C. Newton, Enfield, CT (US); Douglas M. Berczik, Manchester, CT (US); Timothy Coons, Narragansett, RI (US)

(73) Assignee: United Technologies Corporation, Hartford, CT (US)

( * ) Notice: Subject to any disclaimer, the term of this patent is extended or adjusted under 35 U.S.C. 154(b) by 20 days.

(21) Appl. No.: 13/189,013

(22) Filed: Jul. 22, 2011

(65) Prior Publication Data

US 2013/0022826 A1 Jan. 24, 2013

(51) Int. Cl.
| | |
|---|---|
| *B32B 23/04* | (2006.01) |
| *C03C 13/00* | (2006.01) |
| *C04B 35/52* | (2006.01) |
| *C04B 35/80* | (2006.01) |
| *C04B 35/565* | (2006.01) |
| *C04B 35/628* | (2006.01) |

(52) U.S. Cl.
CPC ............. *C04B 35/806* (2013.01); *C04B 35/565* (2013.01); *C04B 35/6286* (2013.01); *C04B 35/62863* (2013.01); *C04B 35/62868* (2013.01); *C04B 35/62871* (2013.01); *C04B 35/62873* (2013.01); *C04B 35/62878* (2013.01); *C04B 35/62884* (2013.01)
USPC ................................ 428/446; 501/35; 501/87

(58) Field of Classification Search
CPC ............ C04B 35/806; C04B 35/62884; C04B 41/5094
USPC ........................................ 501/35, 87; 428/446
See application file for complete search history.

(56) References Cited

U.S. PATENT DOCUMENTS

| | | | |
|---|---|---|---|
| 4,543,345 A | 9/1985 | Wei | |
| 4,994,416 A | 2/1991 | Tiegs et al. | |
| 5,007,508 A * | 4/1991 | Lacombe | 188/251 A |
| 5,194,330 A | 3/1993 | Vandenbulcke et al. | |
| 5,246,736 A | 9/1993 | Goujard et al. | |
| 5,645,781 A | 7/1997 | Popovic' et al. | |
| 5,682,594 A | 10/1997 | Kennedy et al. | |
| 5,888,641 A * | 3/1999 | Atmur et al. | 428/312.4 |
| 5,962,103 A * | 10/1999 | Luthra et al. | 428/107 |
| 5,965,266 A | 10/1999 | Goujard et al. | |
| 6,068,930 A * | 5/2000 | Lamouroux et al. | 428/467 |
| 7,687,016 B1 | 3/2010 | DiCarlo et al. | |
| 8,168,291 B2 * | 5/2012 | Shah et al. | 428/293.4 |
| 2003/0175453 A1 * | 9/2003 | Steffier | 428/34.5 |
| 2005/0233127 A1 | 10/2005 | Steffier | |

FOREIGN PATENT DOCUMENTS

| | | |
|---|---|---|
| EP | 1788117 | 5/2007 |
| EP | 2436835 | 9/2011 |

OTHER PUBLICATIONS

European Search Report Oct. 9, 2012.

* cited by examiner

*Primary Examiner* — D. Lawrence Tarazano
*Assistant Examiner* — Camie Thompson
(74) *Attorney, Agent, or Firm* — Carlson, Gaskey & Olds, P.C.

(57) ABSTRACT

A ceramic composite article includes ceramic carbide fibers and a ceramic matrix in which the ceramic carbide fibers are embedded. The ceramic matrix includes a laminar structure with at least one layer of a first ceramic material and at least one layer of a second, different ceramic material.

20 Claims, 3 Drawing Sheets

CERAMIC COMPOSITE ARTICLE HAVING LAMINAR CERAMIC MATRIX

BACKGROUND

This disclosure relates to ceramic matrix composites.

Ceramic matrix composites are known and used for components that are exposed to high temperatures and corrosive conditions that can degrade other kinds of materials. Under such severe conditions, such as the operating conditions in aerospace and aircraft applications, even ceramic materials are vulnerable to degradation. Over time, ceramic materials can form microcracks that further expose the ceramic material to oxygen or other corrosive elements, which form undesirable phases to the detriment of the properties of the ceramic matrix composite component.

SUMMARY

Disclosed is a ceramic composite article includes ceramic carbide fibers in a ceramic matrix in which the ceramic carbide fibers are embedded. The ceramic matrix includes a laminar structure with at least one layer of a first ceramic material and at least one layer of a second, different ceramic material.

In another aspect, a ceramic composite article includes silicon carbide fibers, an interface coating on the silicon carbide fibers, and a ceramic matrix in which the silicon carbide fibers are embedded. The ceramic matrix includes a laminar structure of alternating layers of a boron-containing material and a silicon-containing material.

Also disclosed is a method of protecting against oxidation in a ceramic composite article. The method includes protecting ceramic carbide fibers and an optional interface coating on the fibers from oxidation by embedding the fibers and the optional interface coating in a ceramic matrix. The ceramic matrix includes a laminar structure of at least one layer of a first ceramic material and at least one layer of a second, different ceramic material. The first ceramic material and the second ceramic material react with oxygen prior to the oxygen reaching the fibers and the optional interface coating to form a glassy phase in the ceramic matrix.

The various features and advantages of the disclosed examples will become apparent to those skilled in the art from the following detailed description. The drawings that accompany the detailed description can be briefly described as follows.

DETAILED DESCRIPTION

Figure 1:
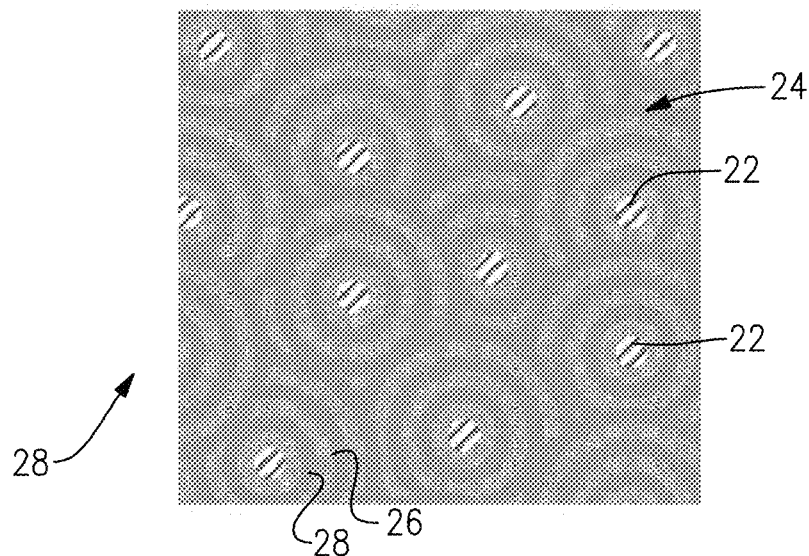
FIG. 1 illustrates an example ceramic composite article having a ceramic matrix with a laminar structure.

FIG. 1 illustrates selected portions of a ceramic composite article 20. The ceramic composite article 20 is shown generically but may be formed in the shape of a desired end use article, such as an aerospace or aircraft component. As will be described in more detail, the ceramic composite article 20 includes a microstructure and ceramic materials that, in combination, extend the long term durability of the ceramic composite article 20.

In the illustrated example, the ceramic composite article 20 includes ceramic carbide fibers 22 (shown in cross-section) and a ceramic matrix 24 in which the ceramic carbide fibers 22 are embedded. In this example, the ceramic matrix 24 is continuous a body that surrounds the ceramic carbide fibers 22. As shown, the ceramic carbide fibers 22 are unidirectionally oriented such that each fiber 22 is parallel to the other fibers 22. It is to be understood, however, that the illustrated orientation of the fibers 22 can be varied such that the fibers 22 are randomly oriented or are oriented with other predefined angular arrangements.

The ceramic matrix 24 has a laminar structure that includes one or more layers of a first ceramic material 26 and one or more layers of a second, different ceramic material 28. As shown, the ceramic composite article 20 includes multiple layers of the first ceramic material 26 and multiple layers of the second ceramic material 28. In other examples, the ceramic composite article 20 includes only one of the layers of the first ceramic material 26, one of the layers of the second ceramic material 28, or only one of each of the layers 26 and 28.

Figure 2:
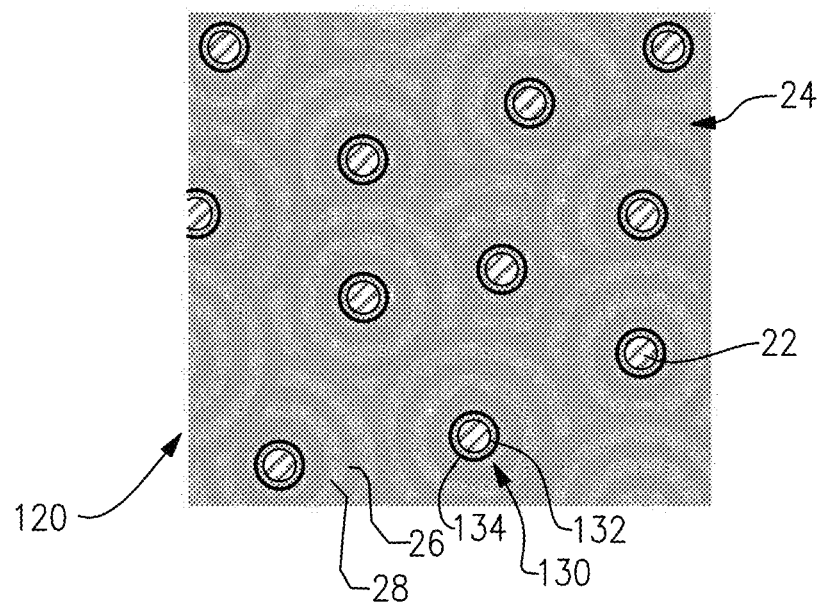
FIG. 2 illustrates a modified ceramic composite article that includes an interface coating between a ceramic matrix and fibers embedded within the matrix.

FIG. 2 illustrates a modified ceramic composite article 120 that is similar to the ceramic composite article 20 of FIG. 1. In this disclosure, like reference numerals designate like elements where appropriate, and reference numerals with the addition of one-hundred or multiples thereof designate modified elements. The modified elements are understood to incorporate the same features and benefits as the corresponding elements. In this example, the ceramic composite article 120 additionally includes an interface coating 130 located between the ceramic matrix 24 and each of the ceramic carbide fibers 22.

In one example, the interface coating 130 is located directly on the peripheral surfaces of the ceramic carbide fibers 22 and includes a continuous coating that circumferentially surrounds each of the fibers 22. In a further example, the interface coating includes a boron nitride.

In the illustrated example, the interface coating 130 is a multi-layer coating and includes at least a first layer 132 and a second layer 134. In other examples, the interface coating 130 includes additional layers, or only a single layer. The interface coating 130 serves as a weak bonding layer between the ceramic carbide fibers 22 and the ceramic matrix 24, to provide toughening through crack deflection upon fracture.

The materials of the ceramic composite article 20, 120 are selected to protect the ceramic carbide fibers 22 and optional interface coating 130 from oxidation. That is, the particular materials selected for the layer or layers of the first ceramic material 26 and the layer or layers of the second ceramic material 28 cooperate to react with oxygen prior to the oxygen reaching the ceramic carbide fibers 22 and the optional interface coating 130. Thus, the ceramic carbide fibers 22 and optional interface coating 130 can be preserved for a longer period of time to extend the long term durability of the ceramic composite article 20, 120.

In one example, the ceramic carbide fibers 22 include a carbide of a metal or metalloid. In some examples, the metal or metalloid carbide is silicon carbide or boron carbide.

In a further example, the layer or layers of the first ceramic material 26 is or includes a boron-containing material and the layer or layers of the second ceramic material 28 is or includes a silicon-containing material. In embodiments, the boron-containing material is crystalline boron carbide and the silicon-containing material is silicon carbide. For instance, the crystalline boron carbide has a rhombohedral crystal structure. The crystalline boron carbide provides a high boron content for boron doped carbon. The boron is reactive with air to form $B_2O_3$ and seals up cracks that can occur in the ceramic matrix 24 from thermally-induced stresses between the different CTE's of the fibers 22 and the matrix 24. This keeps the thermal stress at a minimum. In another example, the boron-containing material is crystalline elemental boron. For instance, the crystalline elemental boron has a hexagonal crystal structure. The crystalline structures provide good thermal resistance that is desired in many end use applications. Additionally, the CTE of crystalline boron-containing material closely matches the CTE of crystalline carbide of the ceramic carbide fibers 22, to reduce thermal stresses. For instance, the CTE of crystalline boron carbide closely matches the CTE of silicon carbide of the ceramic carbide fibers 22.

The optional interface coating 130 of the ceramic composite article 120 includes at least one layer of boron nitride, pyrolytic carbon or silicon nitride. If a multi-layer interface coating 130 is used, the layers are selected from a boron nitride layer, a pyrolytic carbon layer and a silicon nitride layer. That is, the multilayer coating includes alternating layers of two or more of the listed materials. In at least one example, the first layer 132 of the interface coating 130 is directly on the peripheral surface of the ceramic carbide fibers 22 and includes boron nitride.

Figure 3:
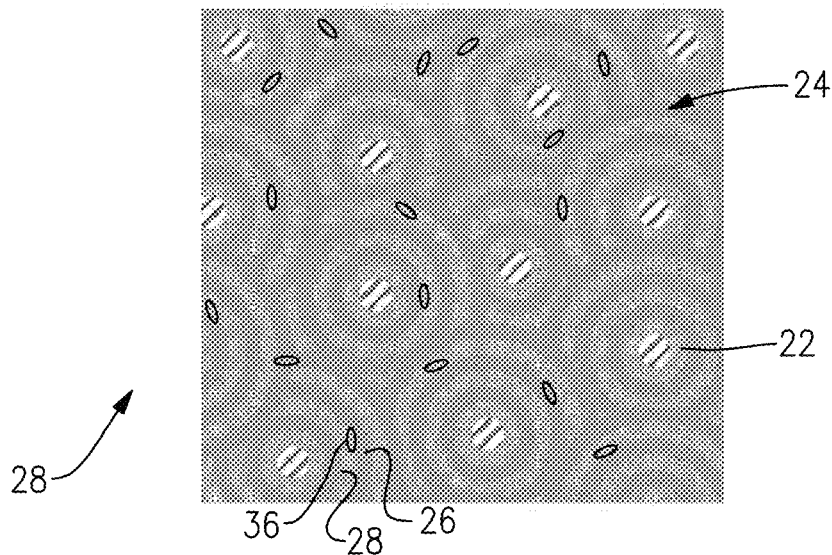
FIG. 3 illustrates a ceramic composite article after a period of use which results in the formation of a glassy phase.

FIG. 3 illustrates the ceramic composite article 20 after period of use in a relatively high temperature environment with exposure to oxygen. It is to be understood that the illustrated example also represents the ceramic composite article 120. As shown, when oxygen infiltrates into the ceramic composite article 20, the oxygen reacts with the layer or layers of the first ceramic material 26 and the layer or layers of the second ceramic material 28 to form a glassy phase 36 within the ceramic matrix 24.

For instance, the first ceramic material and the second ceramic material are selected to cooperatively react with oxygen to form the glassy phase 36. As described above, the boron-containing material and the silicon-containing material are but several examples of such materials. The boron of the boron-containing material and the silicon of the silicon-containing material react to form a borosilicate glass phase. The first ceramic material and the second ceramic material of the laminar structure of the ceramic matrix 24 thereby capture oxygen that infiltrates into the ceramic composite article 20 and limit the amount of oxygen that reaches the ceramic carbide fibers 22 and optional interface coating 130. The ceramic carbide fibers 22 and optional interface coating 130 are thereby preserved (i.e., less degradation) for a longer period of time.

Additionally, the glassy phase 36 provides a self-healing effect that further extends the durability of the ceramic composite article 20. For instance, the ceramic composite article 20 may form microcracks under the high temperature and corrosive conditions of the application environment. The microcracks, if allowed to extend to the ceramic carbide fibers 22 or optional interface coating 130, can provide a path for oxygen to reach the ceramic carbide fibers 22 or optional interface coating 130. However, the reaction between the first ceramic material and the second ceramic material to form the glassy phase 36 arrests the microcracks and thereby prevents further infiltration of oxygen into the ceramic composite article 20.

Figure 4:
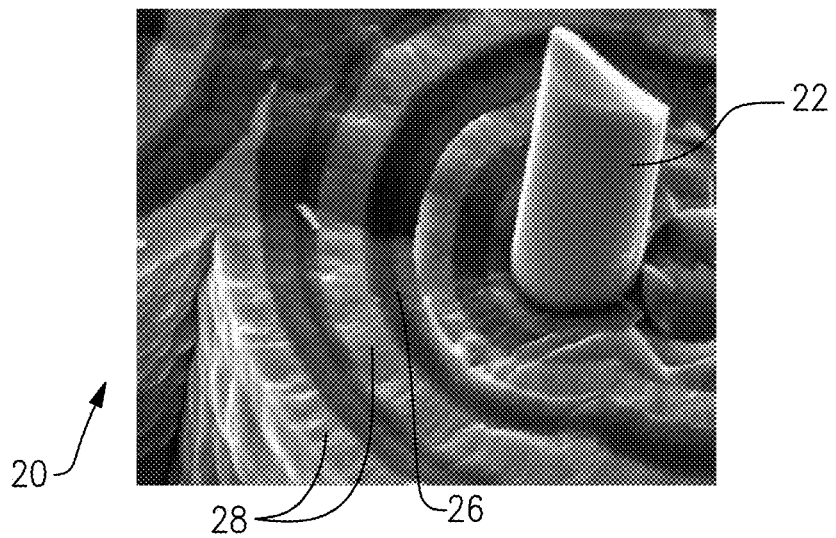
FIG. 4 illustrates a micrograph of a fracture surface of a ceramic composite article.
Figure 5:
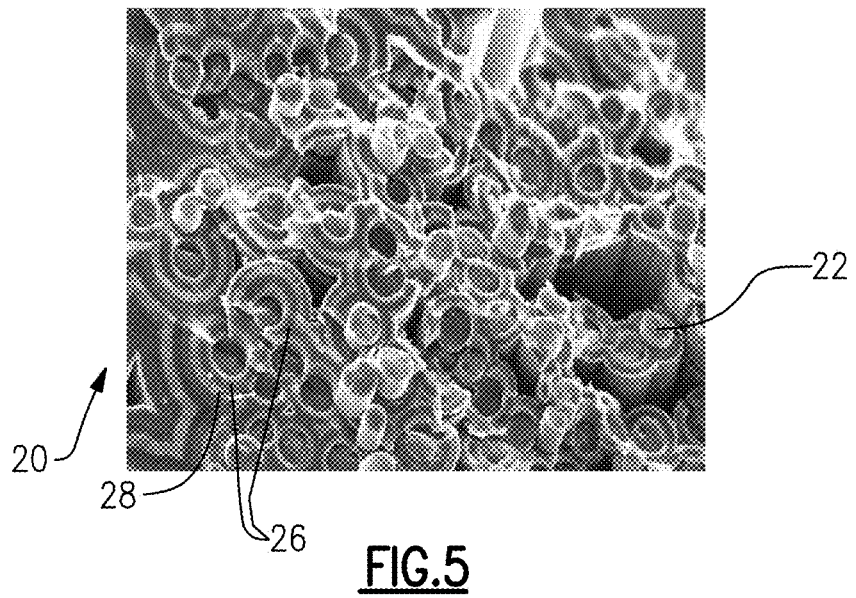
FIG. 5 illustrates another fracture surface of a ceramic composite article.

FIGS. 4 and 5 show micrographs of the ceramic composite article 120 under test conditions that caused a fracture of the ceramic composite article 20. The micrographs show the laminar structure of the ceramic composite article 120, the resulting fracture surfaces and fiber pullout that represents toughening of the composite.

In one example, the ceramic composite article 20, 120 is fabricated using chemical vapor deposition. For example, a fabric containing the ceramic carbide fibers 22 and optional interface coating 130 is placed into a reactor. The reactor delivers suitable vaporized precursors in alternating cycles to thereby deposit the layer or layers of the first ceramic material 26 in alternating fashion with the layer or layers of the second ceramic material 28. The following examples further illustrate the deposition process.

Reagent grade $BCl_3$, propylene ($C_3H_6$), methytrichlorosilane (MTS) and ultra-pure argon and hydrogen were used as the starting materials to deposit the crystalline boron, boron carbide and silicon carbide matrices. The reactor included a fused silica (quartz) tube 9 mm in diameter inside a resistively heated furnace. Swagelok™ compression fittings were used to seal off the reactor and MKS™ Flo Controllers (MFC's) were used to deliver the gases. The ceramic carbide fibers 22 were Nicalon™ fabric. In order to coat the fabric without degradation, the temperature was kept as low as possible. The lowest temperature that crystalline boron carbide could be deposited over a consistent zone was around 1150° C./2102° F. The lowest temperature to deposit boron was around 1000° C./1832° F. The temperature is kept this low to minimize the ceramic carbide of the fibers 22 degradation.

Experimental parameters were used to determine flow rates to deposit crystalline $B_4C$ at a relatively low temperature to avoid fiber degradation. Out of the experimental runs, the working conditions to deposit crystalline $B_4C$ in this reactor set-up were established. These conditions were then used to deposit the boron carbide part of the matrix in all the composites containing boron carbide.

To infiltrate the fabric with the matrix material, the reactor and the mixing chamber were first flushed with Ar in order to remove any air from the system. The reactor was then brought to a deposition temperature in flowing $H_2$. Once the rector reached equilibrium temperature, either a combination of $BCl_3$ and $H_2$, (for B) or $BCl_3$, $H_2$ and $C_3H_6$ (for $B_4C$) or $CH_3SiCl_3$ (MTS) and $H_2$ (for SiC) were allowed to flow, depending on which layer was being deposited. This reiteration process was carried out three to four times in order to produce the laminar structure of the matrix. The deposition parameters for depositing crystalline materials in this reactor set-up included a time of 20-30 minutes, a flow rate of $BCl_3$ of 30-80 standard cubic centimeters per minute (sccm) or 0.5-1.33 cubic centimeters per second (sccs), a flow rate of propylene $C_3H_6$ of 2-4 sccm/0.033-0.067 sccs, a flow rate of hydrogen of approximately 155 sccm/2.58 sccs and a flow rate of argon of approximately 20 sccm/0.33 sccs.

In one aspect, the ceramic composite article 20, 120 uses a relatively high amount of boron-containing material in the ceramic matrix 24. In comparison to matrices that include boron-containing materials that do not have the laminar structure of the ceramic composite article 20, 120, the ceramic composite article 20, 120 provides a structure, the laminar structure, that utilizes a relatively high amount of boron-containing material adjacent to a silicon-containing material, which is reactive in cooperation with the boron-containing material and oxygen to form the glassy phase 36. Other matrices that do not contain the boron-containing material in such a laminar structure are limited in the amount of boron-containing material that can be used, which limits the self-healing effect.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A ceramic composite article comprising:
   ceramic carbide fibers; and
   a ceramic matrix in which the ceramic carbide fibers are embedded, the ceramic matrix including a laminar structure comprising at least one layer of crystalline elemental boron and at least one layer of a ceramic material, the ceramic material including a silicon-containing material.

2. The ceramic composite article as recited in claim 1, wherein the ceramic carbide fibers comprise silicon carbide fibers.

3. The ceramic composite article as recited in claim 1, wherein the silicon-containing material is silicon carbide.

4. The ceramic composite article as recited in claim 1, including an interface coating between the ceramic carbide fibers and the ceramic matrix.

5. The ceramic composite article as recited in claim 4, wherein the interface coating comprises boron nitride.

6. The ceramic composite article as recited in claim 4, wherein the interface coating includes a layer of boron nitride directly on peripheral surfaces of the ceramic carbide fibers.

7. The ceramic composite article as recited in claim 4, wherein the interface coating comprises pyrolytic carbon.

8. The ceramic composite article as recited in claim 4, wherein the interface coating comprises silicon nitride.

9. The ceramic composite article as recited in claim 4, wherein the interface coating is a multi-layer coating that includes at least two layers selected from a group consisting of a boron nitride layer, a pyrolytic carbon layer, and a silicon nitride layer.

10. The ceramic composite article as recited in claim 1, including multiple layers of the crystalline elemental boron first and multiple layers of the ceramic material in alternating arrangement with the multiple layers of the crystalline elemental boron.

11. The ceramic composite article as recited in claim 1, wherein the ceramic carbide fibers comprise boron carbide fibers.

12. The ceramic composite article as recited in claim 1, wherein the crystalline elemental boron has a hexagonal crystal structure.

13. The ceramic composite article as recited in claim 1, wherein the ceramic carbide fibers are silicon carbide fibers, and crystalline elemental boron has a coefficient of thermal expansion and the silicon carbide fibers have a coefficient of thermal expansion that matches the coefficient of thermal expansion of the crystalline elemental boron.

14. A ceramic composite article comprising:
    silicon carbide fibers;
    an interface coating on the silicon carbide fibers; and
    a ceramic matrix in which the silicon carbide fibers are embedded, the ceramic matrix including a laminar structure comprising multiple layers of crystalline elemental boron in alternating arrangement with multiple layers of a silicon-containing material, the crystalline elemental boron having a coefficient of thermal expansion and the silicon carbide fibers having a coefficient of thermal expansion that matches the coefficient of thermal expansion of the crystalline elemental boron.

15. The ceramic composite article as recited in claim 14, wherein the interface coating comprises boron nitride.

16. The ceramic composite article as recited in claim 14, wherein the interface coating comprises pyrolytic carbon.

17. The ceramic composite article as recited in claim 14, wherein the interface coating comprises silicon nitride.

18. The ceramic composite article as recited in claim 14, wherein the silicon-containing material is silicon carbide.

19. The ceramic composite article as recited in claim 14, wherein the interface coating is a multi-layer coating that includes at least two layers selected from a group consisting of a boron nitride layer, a pyrolytic carbon layer, and a silicon nitride layer.

20. The ceramic composite article as recited in claim 14, wherein the crystalline elemental boron has a hexagonal crystal structure.

* * * * *